July 23, 1963 W. F. DE BOICE 3,098,679
PASSIVE CONTROL CIRCUIT FOR ELECTROSTATIC BEARING
Filed Aug. 2, 1961 3 Sheets-Sheet 2

*INVENTOR.*
WILLIAM F. DEBOICE
BY *Edward A. Sokolski*
ATTORNEY

INVENTOR.
WILLIAM F. DEBOICE
BY Edward A. Sokolski
ATTORNEY

United States Patent Office 3,098,679
Patented July 23, 1963

3,098,679
PASSIVE CONTROL CIRCUIT FOR
ELECTROSTATIC BEARING
William F. De Boice, Long Beach, Calif., assignor to
North American Aviation, Inc.
Filed Aug. 2, 1961, Ser. No. 128,781
13 Claims. (Cl. 308—8)

This invention relates to a passive control circuit for an electrostatic bearing and more particularly to such a control circuit in which electrical damping is provided, drain on the power source is minimized, and high efficiency operation is provided.

Electrostatic bearings have been proposed for use in supporting members with three degrees of freedom. Electrostatic bearings have advantages over gas bearings in such applications due to their higher overall efficiency and their ability to as effectively support a member when the member is stationary as when it is rotating at high speed. In addition, where the supported member is the rotor of a gyroscope, the viscous drag produced by a gas bearing which causes an error torque can be eliminated by utilizing an electrostatic bearing with the space between the supported and supporting members evacuated. In an electrostatic bearing, the supported member is suspended between a pair of plates positioned on opposite sides thereof by virtue of electrostatic forces existing between the plates and the supported member with the application of voltage therebetween. As the force generated is a function not only of the voltage applied but also of the spacing between the plates and the supported member (more force being generated with closer spacing), to support a member of any significant weight, it is necessary to apply a substantial voltage between the plates and the supported member and to keep the spacing therebetween small.

To avoid arc-over between closely spaced supported member and plates, with the application of a high voltage, and to minimize viscous drag where the supported member is rotated, it is desirable to evacuate the space between the plates and the supported member to provide a partial vacuum in this space. As is well known in the art, the spacing at which arc-over will occur between two members having a given voltage applied between them, decreases significantly as the space between the two members is evacuated. Experience has indicated, however, that when a bearing is operated in a vacuum, oscillation of the servo system utilized to retain a supported member in the desired support position tends to occur due to the loss of the damping effect of the gas in the bearing space. The device of this invention provides a simple yet highly effective means for electrically damping oscillations which may occur in the bearing servo system. Such damping is provided by an anti-resonant circuit which provides a phase lead in the circuit. In addition, the anti-resonant circuit is connected so that it imposes a minimum load on the power source.

Additionally, a series resonant circuit may be connected across the power source to make for a constant current input to the supported member independent of its displacement relative to the plates. This series resonant circuit is designed to minimize the current drain on the power supply and to make the net electrostatic force produced, a linear function of the displacement of the supported member from the mid-position to provide for more efficient control.

It is therefore an object of this invention to provide an improved passive control circuit for an electrostatic bearing.

It is a further object of this invention to provide electrical damping to stabilize the control of an electrostatic bearing.

It is still another object of this invention to provide a control circuit for an electrostatic bearing which imposes a minimum power demand on the power source and at the the same time operates at high efficiency.

It is still a further object of this invention to enable the operation of an electrostatic bearing in a partial vacuum without sacrificing stability of operation.

It is still another object of this invention to improve the weight support capabilities of electrostatic bearings.

It is still a further object of this invention to provide an electrostatic control circuit in which the current input to the supported member is constant regardless of the displacement of the supported member.

It is another object of this invention to enable the construction of a three-axis support system for a rotating member in which no direct electrical connection to the rotating member is required.

Further objects of this invention will become apparent from the following description taken in connection with the accompanying drawings in which FIG. 1 is a graph illustrating the basic operation of the device of the invention;

Figure 5:
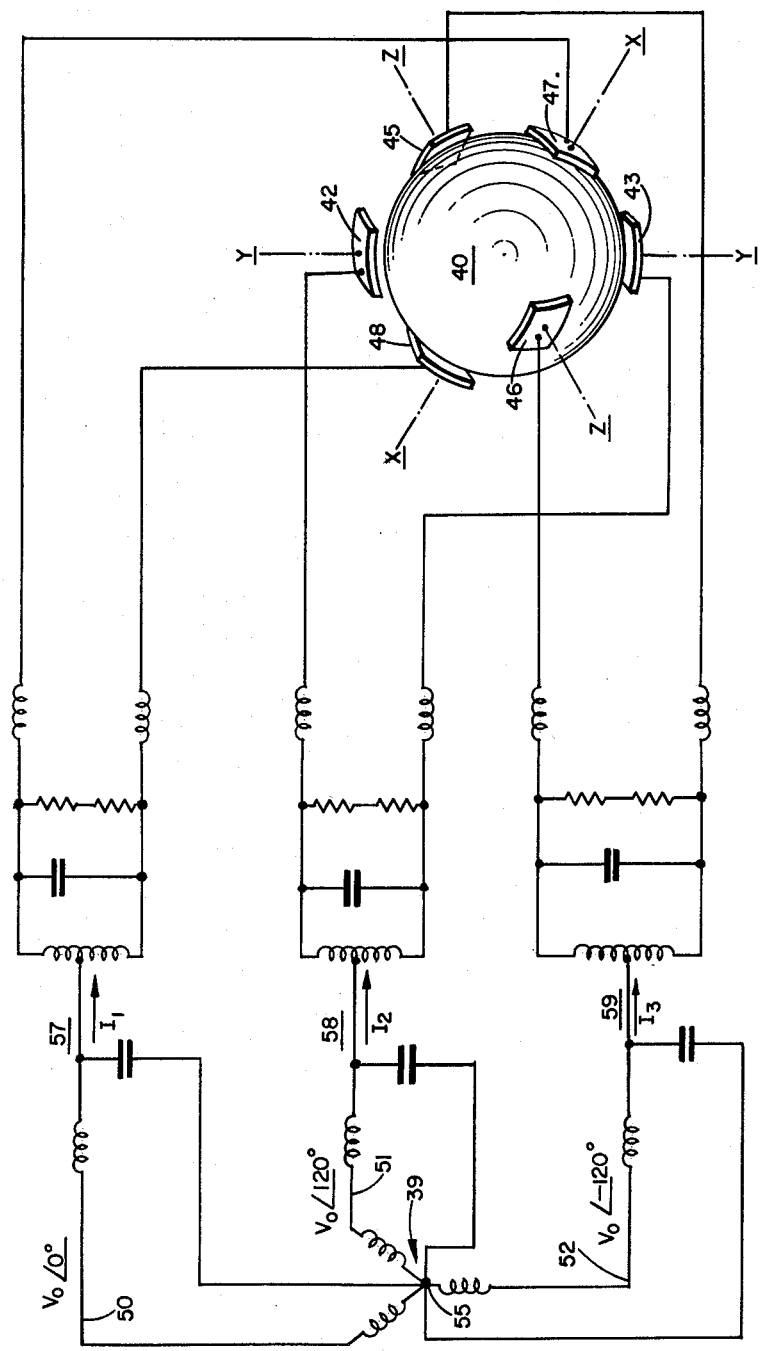

And FIG. 5 is a schematic diagram of a fourth embodiment of the device of this invention.

Figure 1:
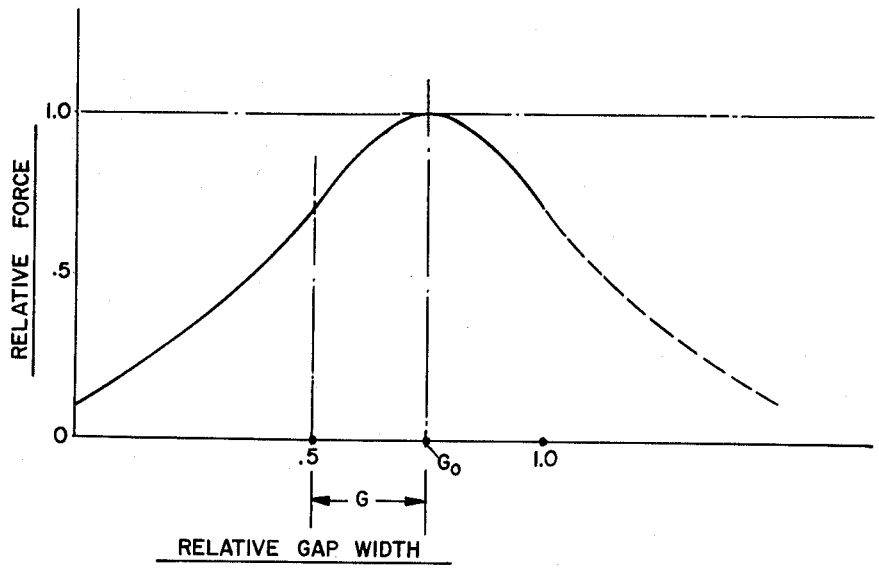
Figure 2:
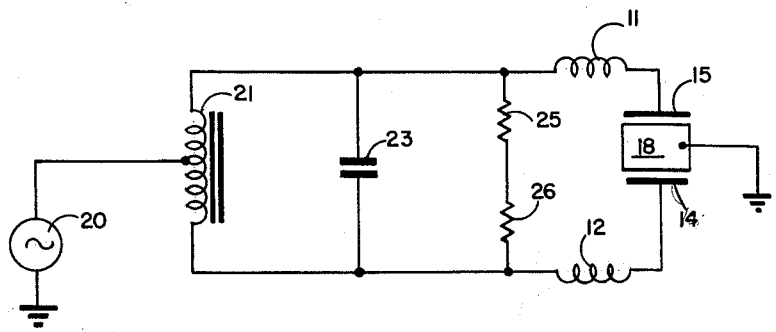
FIG. 2 is a schematic diagram of a first embodiment of the device of the invention.

Referring now to FIGS. 1 and 2, a graph illustrating the basic operation of an electrostatic bearing control circuit in which the device of the invention may be incorporated and a schematic diagram of a first embodiment of the invention are respectively illustrated. Referring to FIG. 2, an A.-C. source 20 is connected between a supported member 18 and a pair of plates 14 and 15 positioned on opposite sides of supported member 18. Due to the electrostatic field generated between plates 14 and 15 and the supported member 18, an attractive force between each of plates 14 and 15 and supported member 18 results. In order for the member 18 to be supported, the forces acting thereon due both to the electrostatic fields generated between plates 14 and 15 and the member and due to accelerations including that of gravity must have a sum total of zero. It is desirable to achieve such a state of equilibrium with the supported member 18 midway between plates 14 and 15 to assure maximum clearance between the plates and the supported member to minimize the chances of contact therebetween. It is also necessary that once equilibrium is achieved that means be provided to return the supported member 18 to a balanced central position should the equilibrium be disturbed by acceleration inputs to the system. Such control is achieved by designing the circuit so that inductor 11 forms a series resonant circuit with the capacitance between plate 15 and member 18 and inductor 12 forms a series resonant circuit with the capacitance between plate 14 and member 18. Such series resonant occurring at the frequency of the output of source 20 and with the gap between plate 15 and supported member 18 or plate 14 and supported member 18 greater than the gap with supported member 18 at the midposition.

FIG. 1 illustrates this condition, with "$G_0$" indicating the relative gap width between each one of the plates and the supported member at which a resonant condition is achieved. As shown in FIG. 1, for example, with the gap width beween either the plate 15 or plate 14 and supported member 18 about seven tenths of the total possible maximum gap width, the capacitance formed between either of the plates and the supported member will form a series resonance circuit with the inductance of either inductor 11 or inductor 12 as the case may be. The equilibrium point or point at which member 18 is supported is at a point at which the relative gap width is .5 which is the condition where the gap width between plate 15 and the supported member 18 and between plate 14 and the supported member are equal. The difference between the gap width at equilibrium and the gap width at resonance is represented by "G."

It is to be noted that the control system is designed so that the equilibrium point is reached at a point at which the inductive reactance of each of inductors 11 and 12 is greated than the capacitive reactance formed between the plates 15 and 14, respectively, and supported member 18. Such a condition is necessary for proper servo control action to restore supported member 18 to the desired equilibrium point in the event of disturbance of this equilibrium. As can be seen, for example, if the disturbance should be such as to increase the gap width between plate 15 and the supported member and decrease the gap width between plate 14 and the supported member, the relative attractive force between plate 15 and the supported member will increase as indicated by FIG. 1 due to the fact that as the gap width increases, the resonant condition is approached. At the same time, as the gap width between plate 14 and supported member 18 decreases, the force therebetween will decrease in view of the fact that greater departure from the resonant point will be made. Thus, the forces acting on supported member 18 will be such as to return it to equilibrium at the midposition.

It has been found that such a servo control system will operate satisfactorily only if adequate damping with the motion of the supported member is provided. In the absence of any such damping, the supported member 18 will tend to oscillate intolerably each time equilibrium is disturbed.

To better explain the nature of the forces involved it might be well to examine the mathematical equations describing these forces. The equation for the average value of the force $F_0$ acting between plates 14 and 15 and supported member 18 under equilibrium conditions is as follows:

$$F_0 = \frac{KV_0^2}{A\omega_0^2 R^2}\left(\frac{+4\gamma\delta}{\gamma^2+(\gamma^2-\delta^2)^2}\right) \quad (1)$$

where $K$ = a constant depending on the units chosen
$V_0$ = R.M.S. supply voltage
$g$ = displacement of supported member 18 from the midposition
$G_0$ = gap distance at resonance
$A$ = area of each of the plates
$\omega_0$ = angular velocity of supply voltage
$G$ = separation between $G_0$ and the midposition
$R$ = effective resistance of each of the series tuned circuits $$Q_0 = \frac{\omega_0 L}{R}$$

the "Q" of the series tuned circuits $$\gamma = \frac{GQ_0}{G_0}$$

an index of the displacement of the supported member from the resonant position $$\delta = \frac{gQ_0}{G_0}$$

an index of the displacement of the supported member from the midposition

Analysis indicates that there is a lag in the response of the restoring mechanism should the equilibrium condition defined by Equation 1 be disturbed. This will produce an oscillatory condition unless damping is introduced into the system. Experience has indicated that the use of gas or liquid damping between the plates and the supported member generally provides the most effective damping technique. However, as already noted, the use of liquid or gas between the bearing surfaces would seriously hamper the capabilities of the electrostatic support system by limiting the support force that could be generated without producing arc-over and by subjecting the supported member to viscous drag if it is rotated. It is therefore highly desirable to evacuate the space between support plates 14 and 15 and the supported member 18 if some other means for introducing damping into the servo loop to remove unstability can be provided.

Damping is provided in the device of this invention by introducing a phase lead into the servo loop by means of an anti-resonant circuit comprising inductor 21 and capacitor 23. These components are chosen so that they are anti-resonant at the frequency of A.-C. power source 20. A.-C. power source 20 is connected to the center tap of inductor 21. With supported member 18 in the midposition between plates 14 and 15, the current flowing through the upper half of inductor 21, inductor 11, plate 15, and support member 15 is equal to the current flowing through the lower half of inductor 21, inductor 12, plate 14, and supported member 18. As already noted, it is at this position that equilibrium is achieved. Under such conditions, the voltage appearing across the anti-resonant circuit comprising inductor 21, capacitor 23, and series connected resistors 25 and 26 will be zero. Assuming inductor 21 and capacitor 23 to be perfectly reactive elements, the power dissipated through them and resistors 25 and 26 will also be zero. There always is, of course, some resistive loss in practical reactive elements, which means that some small amount of power will be dissipated in inductor 21 and capacitor 23, but with proper design, such power losses will be negligible.

If supported member 18 is displaced from its center position as, for example, by an acceleration input due to gravity, the current through the path to one of plates 14 and 15 will increase while the current in the path to the other plate will decrease to provide forces which will tend to restore member 18 to the midposition. The anti-resonant circuit comprising inductor 21 and capacitor 23 will under such conditions introduce a current phase lead in the servo loop which will have a damping effect on the loop and prevent oscillation. The transient response of the system for small displacements from the midposition in terms of the force F acting on the supported member 18 is described by the following Laplace expression:

$$F = \frac{kV_0^2}{A\omega_0^2 R^2}\left(\frac{+4\delta}{\gamma(1+\gamma^2)}\right)\left[\frac{1+ST_2}{1+ST_1+S^2T_1T_2}\right] \quad (2)$$

where the symbols previously used in Equation 1 are here similarly defined, and $S$ = the Laplace operator $$T_1 = \frac{2Q_0}{\omega_0}$$

$Q_1$ = the "Q" of the anti-resonant circuit formed by inductor 21 and capacitor 23 and $$T_2 = \frac{2Q_1}{\omega_0}$$

It is to be noted that in a practical system, $Q_0$ the "Q" of the series tuned circuit should be fairly low. This means that a considerable amount of power from source 20 is required to produce the necessary voltage between plates 14 and 15 and supported member 18. The use of the anti-resonant circuit comprising elements 21 and 23 as already indicated imposes a minimal drain on supply 20 with the supported member in the equilibrium position. Resistors 25 and 26 should each be equal to R, the effective resistance of each of the series tuned circuits to provide most efficient operation.

Figure 3:
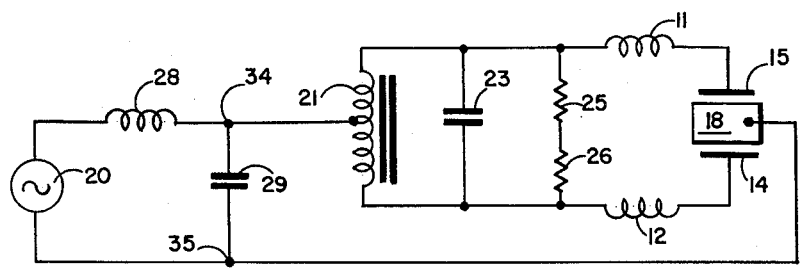
FIG. 3 is a schematic diagram of a second embodiment of the device of the invention.

Referring now to FIG. 3, a second embodiment of the device of the invention which utilizes an L network comprising inductor 28 and capacitor 29 which acts as a constant current coupling network is shown. With a constant current drive, the series resonant circuit formed between each of the plates 14 and 15 and the supported member 18 will tend to have a linear force-displacement curve. Such a linear curve is desirable in order to avoid the low stiffness near the null position that characterizes the performance of systems using constant voltage drives and also to avoid various spurious effects of non-linearity such as vibration rectification. Moreover, with a constant current into the supported member from each pair of plates, it is possible to construct a multi-axis system without an electrical return connection from the supported member by arranging the various current generators so that the sum of their outputs is zero. Such a system using three-axis support is illustrated, for example, in FIG. 5 and will be explained in connection with that figure.

In addition, with the supported member 18 at the midposition, if the reactances of inductor 28 and capacitor 29 at the frequency of power source 20 are chosen to be equal to the impedance looking into the control circuit between points 34 and 35, then the reactive power drain on supply 20 will be minimized in view of the fact that under such conditions, capacitor 29 will form an anti-resonant circuit with the inductance seen looking into the control circuit between points 34 and 35.

In summary, then to achieve the desired efficient operation, the inductive reactance of inductor 28 must be made equal to the capacitive reactance of capacitor 29 at the supply frequency of power source 20 and this reactance should be made equal to the inductive reactance looking into the control circuit between points 34 and 35 when the supported member 18 is at the midposition.

The load impedance $Z_0$ on the L network looking towards the control circuit between points 34 and 35 with supported member 18 at its midposition is as follows:

$$Z_0 = j\frac{R\gamma}{2} \qquad (3)$$

As already noted, the reactances of inductor 28 and capacitor 29 at the frequency of the A.-C. source 20 are chosen to be equal to $$\frac{R\gamma}{2}$$

which is equal in magnitude to the load impedance (inductively reactive) presented by the control circuit with member 18 at the midposition. Therefore, the current $I_0$ into the load from the L network is as follows:

$$I_0 = \frac{-j2V_0}{R\gamma} \qquad (4)$$

where $V_0$ is the voltage output of power source 20.

While the current from the L network into the control circuit is constant as indicated by Equation 4 the impedance of the entire circuit (including the L network) is a function of the displacement $g$ of the supported member 18 from the midposition. The current drain $I_1$ on the power supply 20 is therefore a function of $g$ as follows:

$$I_1 = \frac{2V_0}{RG^2} \cdot \frac{g^2}{1+j\gamma} \qquad (5)$$

It can also be shown that the electrostatic force acting on the supported member 18 in the device illustrated in FIG. 3 is as follows:

$$F = \frac{kI_0^2}{4A\omega^2} \cdot \frac{4\gamma\delta}{1+\gamma^2} \qquad (6)$$

The various parameters of Equations 3–6 are as indicated earlier in the specification with reference to Equation 1.

Equation 4 illustrates the fact that the current flowing into supported member 18 is constant. Equation 5 illustrates that there is minimum current drain on the power source 20 with the supported member in the midposition, $g$ being zero under this condition. Equation 6 indicates that the force acting on member 18 is a linear function of the displacement from the midposition.

Figure 4:
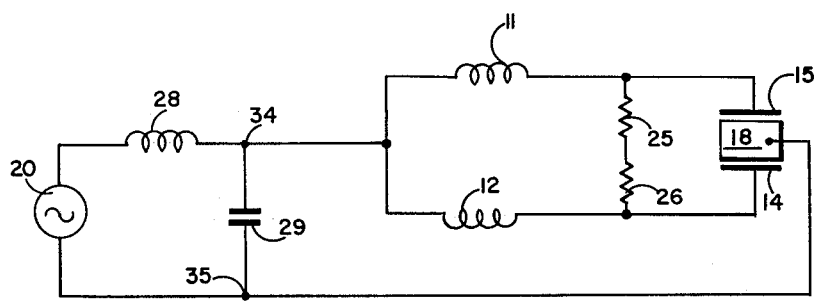
FIG. 4 is a schematic diagram of a third embodiment of the device of the invention.

Referring to FIG. 4, a third embodiment of the device of the invention as illustrated, this embodiment utilizes the series resonant circuit comprising inductor 28 and capacitor 29 in a circuit which does not incorporate the anti-resonant circuit formed by inductor 21 and capacitor 23 as shown in FIGS. 2 and 3. This circuit may be advantageously utilized where suitable damping is provided for the supported member 18 by means such as, for example, utilizing either a liquid or a gas between plates 14 and 15 and the supported member 18.

The "L" filter comprising inductor 28 and capacitor 29 is resonant at the supply frequency of power source 20 as for the embodiment described in FIG. 3 and the reactances of these elements is equal to the effective reactance looking into the control circuit between points 34 and 35 with supported member 18 at the balanced position. Except for the electrical damping which is provided in the embodiment of FIG. 3 by the anti-resonant circuit comprising inductor 21 and capacitor 23, the embodiment of FIG. 4 operates in essentially the same fashion as described for FIG. 3.

Referring now to FIG. 5, a three-axis control system utilizing the device of the invention is illustrated. Balanced three-phase symmetrical power source 39 has its 0° phase output line 50 connected to the input of "X" axis control circuit 57, its 120° phase output line 51 is connected to "Y" axis control circuit 58 and its —120° phase output line 52 connected to "Z" axis control circuit 59. Each of the control circuits 57, 58, and 59 is an embodiment of the circuit shown in FIG. 3 and all of the circuits have the same electrical characteristics as combined with their respective support plates. Support plates 47 and 48 are utilized in conjunction with control circuit 57 to support the supported member 40 along the X axis, support plates 42 and 43 which are included in control circuit 58 are utilized to support member 40 along the Y axis, while support plates 45 and 46 are included in control circuit 59 and are utilized for the Z axis for support of member 40.

With a balanced symmetrical three-phase supply 39 with substantially identical control circuits 57, 58, and 59, and with the L filters acting to keep the currents $I_1$, $I_2$, and $I_3$ to the respective X, Y, and Z axis control circuits constant, the currents $I_1$, $I_2$, and $I_3$ flowing to supported member 40 will always be equal in magnitude. Under such conditions as well known in the art, the sum of these three current phases will be zero. It therefore will not be necessary for any electrical connections from neutral point 55 to supported member 40 to properly complete the circuits.

The use of such a three-phase balanced supply in conjunction with the constant current "L" input circuits therefore greatly facilitates the construction of a three-axis support system by providing means for maintaining the potential on the supported member and the return terminal of the power source equal, obviating the necessity of any wiring connection to supported member 40. Where supported member 40 is to be rotated at high speeds as in a gyroscope, the advantages of this feature are quite apparent.

While the device of this invention may be utilized in any application where a member is to be supported free of physical contact with surrounding objects, a particularly significant application is a free-rotor gyroscope, in which suuported member 40 could be a spherical gyro rotor capable of being rotated on the electrostatic support bearings formed between it and the associated plates for each of the X, Y, and Z axes. An embodiment of the device of the invention utilizing a spherically-shaped supported member and incorporating the three-axis support system illustrated in FIG. 5 has been designed. In this system, there is 150 microinches spacing between each of the plates and the supported member with the supported member at its midposition. The displacement of the supported member from the center position under conditions of 1 g acceleration is 20 microinches. The maximum voltage between the support plates and the supported member is 300 volts. To achieve such operation without arc-over between the plates and the supported member, it is necessary that the space therebetween be highly evacuated. The frequency of the supply voltage from source 39 is in the neighborhood of 20 kilocycles.

The device of this invention thus provides a high efficient control circuit for controlling the electrostatic support of a member which can be suspended either while stationary or while rotating at high speed.

Although the invention has been described and illustrated in detail, it is to be clearly understood that the same is by way of illustration and example only and is not to be taken by way of limitation, the spirit and scope of this invention being ilmited only by the terms of the appended claims.

I claim:

1. In an electrostatic bearing control circuit for controlling the support of a member between at least a pair of plates, means for establishing an A.-C. potential between said plates and said supported member, separate inductive means for forming a resonant circuit with the capacitance of an associated one of said plates when said one of said plates is further from said member than the other of plates, and means interposed between said means for establishing a potential and said inductive means for introducing an electrical phase lead into said control circuit.

2. The circuit as recited in claim 1 and additionally comprising means interposed between said means for establishing potential and said means for introducing a phase lead for keeping the current flowing into said means for introducing phase lead substantially constant.

3. A circuit for use in controlling an electrostatic bearing, said bearing being formed between a supported member and at least a pair of plates positioned on opposite sides of said member, comprising an A.-C. power source having at least a pair of output terminals, a separate inductance connected between one terminal of said power source and each of said plates, each said inductance having an inductive reactance at the power source frequency greater than the capacitive reactance formed between each said plate and said member with said member equidistant from both said plates, an L/C circuit anti-resonant at said source frequency interposed between said one terminal of said power source and said inductances, and means for maintaining substantially zero potential between the other terminal of said power source and said supported member.

4. In a circuit for controlling an electrostatic bearing, said bearing being formed between a supported member and at least a pair of plates positioned on opposite sides of said member, said supported member being positioned midway between said plates, means for establishing an A.-C. potential between said plates and said supported member, an inductor connected between one terminal of said means for establishing potential and each of said plates, each said inductor having a greater reactance at the source frequency than the capacitance formed between the associated plate and said supported member, and a series connected L/C circuit, resonant at the source frequency connected across the terminals of said source, the common connection between the L and C elements of said L/C circuit being connected to one end of said inductors.

5. In a circuit for controlling an electrostatic bearing, said bearing being formed between a supported member and at least a pair of plates positioned on opposite sides of said member, said supported member being positioned midway between said plates, an A.-C. power source having at least a pair of output terminals, an inductor connected between one terminal of said source and each one of said plates, each said inductor having a greater reactance at the source frequency than the capacitance formed between the associated plate and said supported member, a series connected L/C circuit, resonant at the source frequency connected across the terminals of said source, the common connection between the L and C elements of said L/C circuit being connected to one end of each of said inductors, and means for maintaining substantially zero potential between said supported member and the other of said source terminals.

6. In a circuit for controlling an electrostatic bearing, said bearing being formed between a supported member and at least a pair of plates positioned on opposite sides of said member, said supported member being positioned midway between said plates, means for establishing an A.-C. potential between said plates and said supported member, a separate inductor connected at one end thereof to each of said plates, each said inductor having a greater reactance at the source frequency than the capacitance formed between the associated plate and said supported member, a parallel connected L/C circuit, anti-resonant at the frequency of the output of said means for establishing potential, said parallel circuit being connected between the other ends of said inductors, and a series connected L/C circuit resonant at the frequency of the output of said means for establishing potential connected across the terminals of said means for establishing potential, the common connection between the L and C elements of said series circuit being connected to said parallel circuit.

7. A control circuit for an electrostatic bearing, said bearing being formed between an electrically conductive member to be supported and a first and second electrically conductive plate positioned on opposite sides of said member; comprising an A.-C. power source having at least a pair of output terminals, means for maintaining the potential between one terminal of said power source and said member at substantially zero, first and second inductors, one end of each of said inductors being connected respectively to said first and second plates, the capacitance between each of said plates and said supported member with a preselected spacing therebetween forming a series resonant circuit with the inductor connected thereto at the frequency of the output of said A.-C. power source, a series connected L/C circuit, resonant at said source output frequency connected across the terminals of said source, and electrical means for introducing a phase lead in said control circuit comprising a parallel L/C circuit, anti-resonant at said source output frequency, connected between said series connected circuit and the other ends of said inductors.

8. A control circuit for an electrostatic bearing, said bearing being formed between an electrically conductive member to be supported and a first and second electrically conductive plate positioned on opposite sides of said member; comprising an A.-C. power source having at least a pair of output terminals, means for maintaining substantially zero potential between one terminal of said power source and said member, first and second inductors connected respectively between said first and second plates and the other terminal of said power source, the capacitance between each of said plates and said supported member with a preselected spacing therebetween forming a series resonant circuit with the inductor connected thereto at the frequency of the output of said A.-C. power source, and electrical means for introducing a phase lead in said control circuit comprising a parallel connected L/C circuit, anti-resonant at said source output frequency, interposed between said power source and said inductors.

9. The circuit as recited in claim 8 wherein said parallel connected L/C circuit comprises a third inductor having a center tap, said other terminal of said power source being connected to said center tap, and a capacitor connected across the ends of said third inductor, one end of said capacitor and said third inductor being connected to one end of said first inductor, the other end of said capacitor and third inductor being connected to one end of said second inductor.

10. The device as recited in claim 8 and additionally comprising a series connected L/C circuit resonant at said source frequency connected across said pair of output terminals.

11. An electrostatic bearing control circuit for use with a system for supporting a member along three axes between pairs of oppositely positioned plates along each of said axes, comprising a three-phase balanced power supply, first control circuit means responsive to a first of the phase outputs of said supply connected to the plates along a first one of said axes for controlling the support of said member along said first of said axes, second control circuit means responsive to a second of the phase outputs of said supply connected to the plates along a second of said axes for controlling the support of said member along said second of said axes, third control circuit means responsive to a third of the phase outputs of said supply connected to the plates along a third one of said axes for controlling the support of said member along said third one of said axes, each of said control circuit means comprising a separate inductor connected at one end thereof to each of said plates of an associated pair, a parallel L/C circuit anti-resonant at the frequency of said supply connected between the other ends of said inductors, and means interposed between the associated one of said power supply phase outputs and said parallel L/C circuit for maintaining the current fed to said parallel L/C circuit constant.

12. The circuit as recited in claim 11 wherein said means for maintaining the current fed to said parallel circuit constant comprises a series L/C circuit resonant at the frequency of said supply connected across the terminals of the associated one of said power supply phase outputs, the common connection between the L and C components of said series circuit being connected to said parallel circuit.

13. The circuit as recited in claim 12 wherein each of said parallel L/C circuits comprises an inductor having a center tap, said common connection between the L and C components of said series circuit being connected to said center tap.

References Cited in the file of this patent

UNITED STATES PATENTS

| | | |
|---|---|---|
| 2,785,573 | Bentley | Mar. 19, 1957 |
| 2,942,479 | Hollmann | June 28, 1960 |
| 3,003,356 | Nordsieck | Oct. 10, 1961 |